United States Patent [19]

Clohessy

[11] Patent Number: 5,353,890
[45] Date of Patent: Oct. 11, 1994

[54] LOCKING HUB CLUTCH SYSTEM
[75] Inventor: Kip Clohessy, Milwaukie, Oreg.
[73] Assignee: Warn Industries, Milwaukie, Oreg.
[21] Appl. No.: 972,425
[22] Filed: Nov. 5, 1992
[51] Int. Cl.⁵ .............................................. B60K 17/26
[52] U.S. Cl. .................................. 180/247; 180/253; 192/359; 192/67 R; 192/85 V
[58] Field of Search ............... 180/247, 249, 233, 245, 180/253; 192/3.57, 3.59, 67 R, 85 R, 86, 88 A, 85 V, 50

[56] References Cited
U.S. PATENT DOCUMENTS

| | | | |
|---|---|---|---|
| 3,605,931 | 9/1971 | Firth et al. | 180/253 |
| 4,212,557 | 7/1980 | Overbeck | 192/67 R |
| 4,273,460 | 6/1981 | Ueno | 180/247 |
| 4,293,061 | 10/1981 | Brown | 192/67 R |
| 4,625,846 | 12/1986 | Gomez | 180/247 |
| 4,627,512 | 12/1986 | Clohessy | 180/247 |
| 4,928,804 | 5/1990 | Wakahayashi | 180/247 |
| 4,960,192 | 10/1990 | Kurihara | 180/247 |
| 5,085,304 | 2/1992 | Barroso | 192/67 R |
| 5,141,088 | 8/1992 | Kurihara et al. | 180/247 |
| 5,148,901 | 9/1992 | Kurihara et al. | 192/67 R |

Primary Examiner—Richard M. Camby
Assistant Examiner—Kevin Hurley
Attorney, Agent, or Firm—Robert L. Harrington

[57] ABSTRACT

An integrated wheel end for a vehicle is disclosed. The integrated wheel end has a hub rotatably mounted to a bearing pack. The integrated wheel end is secured to the vehicle by fastening the bearing pack to a knuckle of the vehicle. The integral hub has a spindle portion for receiving an end portion of a drive axle, a clutch housing for receiving a locking clutch mechanism and a flange for the mounting of a brake rotor and a vehicle supporting wheel. A locking hub clutch is mounted in the clutch housing and is selectively operated to provide unity of rotation between the axle and the hub or to provide independent rotation of the axle and the hub. The clutch housing is suited for installing different clutch mechanisms including manually operated and pressure operated either by negative or positive pressure. The integrated wheel end has a sealed defined cavity and an air circuit for the introduction or withdrawal of air to operated the pressure operated clutch mechanisms. A manual override feature may be provided with the pressure operated clutch mechanisms to operate the clutch mechanisms manually in the event of air circuit failure.

6 Claims, 9 Drawing Sheets

LOCKING HUB CLUTCH SYSTEM

BACKGROUND INFORMATION

1. Field of the Invention

This invention relates to a locking hub system for a vehicle; it applies to vacuum, pressure or manual operation; it encompasses an integral member that provides a live spindle, hub and clutch housing as well as the provision for a manual override applicable to normal vacuum or pressure actuation.

2. Background of the Invention

Locking hubs for four wheel drive vehicles are available in many different design configurations. Such configurations include direct manual clutch engagement, remote vacuum clutch engagement, and remote pressure clutch engagement. Depending on circumstances, it is desirable to provide these various configurations for either live spindle or dead spindle wheel hub designs and to provide the remote vacuum and remote pressure clutch designs with a direct manual override, e.g. in instances of remote control failure. It is furthermore desirable to provide these numerous alternative locking hub designs with minimum alteration of the basic composition, i.e., it is desirable to have maximum interchangeability of the basic components.

Many patents have been issued covering individual systems of various ones of these design configurations. Examples of known systems are disclosed in the following patents: U.S. Pat. No. 4,273,460 to Ueno, issued Jun. 16, 1981, discloses a live spindle (as that term is used herein) and a manually operated clutch. U.S. Pat. No. 4,627,512 to Clohessy (assigned to the assignee hereof), issued Dec. 9, 1986, discloses a dead spindle and a remote vacuum air operated automatic hub clutch. U.S. Pat. No. 4,293,061 to Brown, issued Oct. 6, 1981, discloses various remote controlled hub lock systems including mechanical actuation and fluid pressure actuation. These are but a few examples of the many patents covering locking hub systems for part time four wheel drive systems.

Each of the systems of these patents disclose a complex design or designs having a specific type of actuation and which are dedicated to a specific design configuration. The present invention provides in part the benefit of a basic system having numerous alternate design configurations.

BRIEF SUMMARY OF THE INVENTION

In one of the configurations of the preferred system, a vacuum actuated hub clutch is uniquely applied to a live spindle. The live spindle is a unique design as well and integrates a combination of components including the spindle, hub flange for wheel mounting, and housing for the clutch elements. The same arrangement of vacuum actuated/integrated live spindle design is adaptable to a manual clutch override, also of unique design. Each of the unique features of the invention are individually applicable to alternate concepts wherein any one or any two of the unique features are independently applicable to various hub clutch designs.

The unique features, individually and in combination, will be more clearly understood and appreciated by reference to the detailed description and accompanying drawings.

DESCRIPTION OF THE PREFERRED EMBODIMENT

Figure 1:
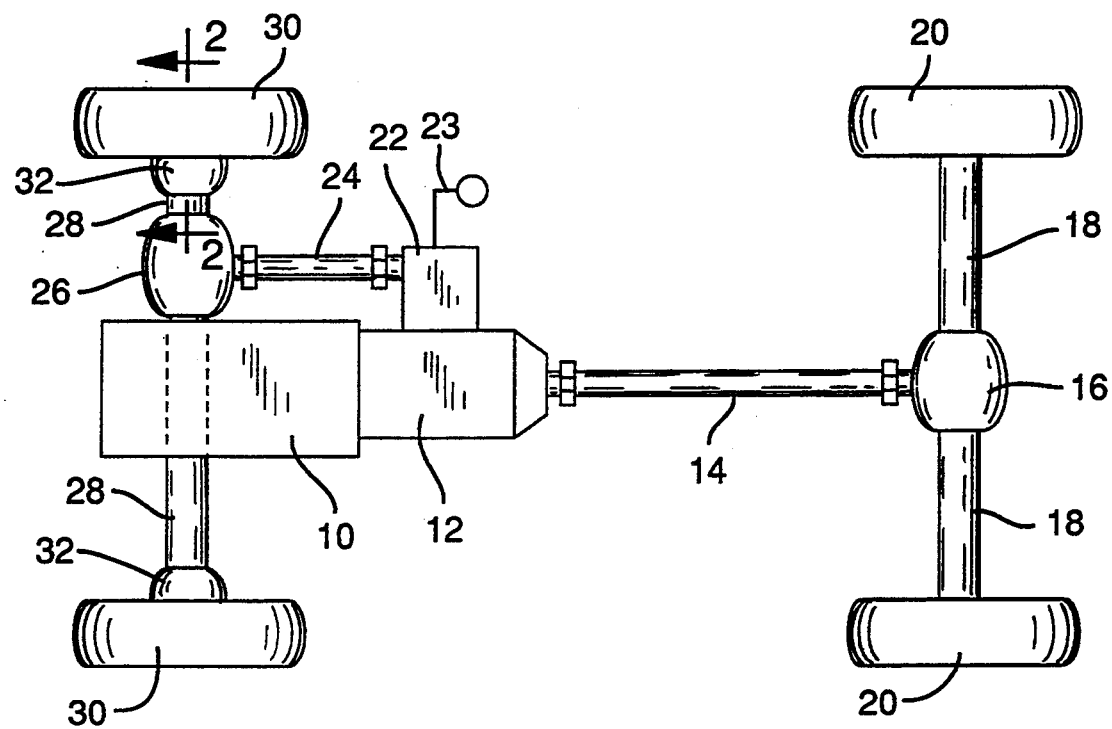
FIG. 1 is a schematic view of a vehicle as contemplated for incorporating the inventions hereof.

Refer now to FIG. 1 of the drawings which illustrates the drive mechanism for a part-time four wheel drive vehicle. The rotative power of the vehicle engine 10 is transmitted to the rear wheels 20 by the transmission 12 rotating the propeller shaft 14 coupled to the rear differential 16. Axles 18 extending from the differential 16 rotate the rear wheels 20. The rotative power of the engine 10 is transmitted to the front wheels 30 by a transfer case 22 (coupled to the transmission 12) that rotates the front propeller shaft 24 coupled to the front differential 26. Axles 28 extending from the differential 26 rotate the front wheels 30. The wheels 30 are mounted on hubs 36 which are not in view in FIG. 1 but are illustrated in subsequent figures and further described.

As is known, the transfer case 22 has shift mechanism 23 to either provide rotative power to the front propeller shaft 24 or not to provide rotative power. Thus the vehicle may be operated in two wheel drive or four wheel drive depending on the shift selection of the transfer case.

The front wheels 30 of the vehicle are steerable and the vehicle is provided with steering knuckles, generally indicated by the numeral 32. The front axles 28 extending from the front differential 26 are thus provided with universal joints (not shown) to accommodate the steering capability.

Figure 2:
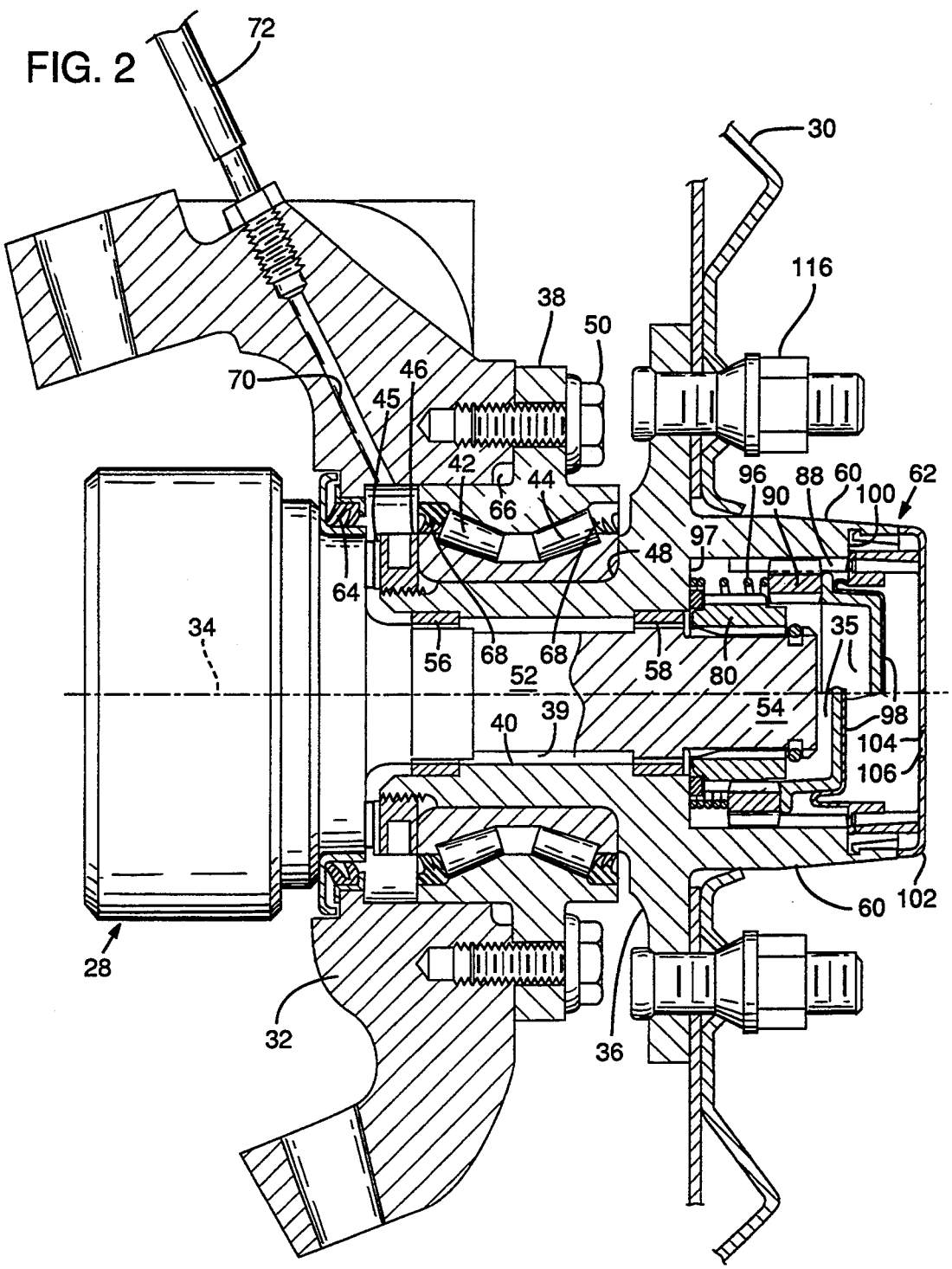
FIG. 2 is a view of a vacuum actuated hub clutch mechanism applied to a live spindle in accordance with the inventions hereof.

FIG. 2 illustrates a clutch mechanism that couples or uncouples the right wheel 30 to the axle 28 (only a portion of wheel 30 is shown). It will be understood that the axle 28 and wheel 30 can remain coupled and the vehicle shifted between two-wheel and four-wheel drive solely through actuation of shift lever 23 (FIG. 1). However, if the clutch mechanism remains coupled to the axles 28 when the vehicle is driven in two wheel drive mode, the wheels 30 will force rotation of the axles 28 and the front propeller shaft 24 via the front differential 26, This is undesirable as it consumes power and causes unnecessary wear to that portion of the drive train. The front wheels 30 are thus preferably engaged with axle 28 only while operating the vehicle in four-wheel drive.

As indicated by the view lines 2—2 of FIG. 1, FIG. 2 shows the knuckle 32, a portion of axle 28, the wheel and its mounting and the clutch mechanism for coupling and uncoupling the wheels to the axle. The wheel mounting is of the live spindle type. As the term is used herein, the spindle is the support member that provides the bearing support for the wheel. It can be fixed to or be a part of the knuckle and function as a bearing sleeve around which the wheel hub rotates, referred to as a dead spindle. Alternately, it can be fixed to or be a part of the hub of the wheel and function as a bearing sleeve that is rotatively supported in a bearing mount provided in the knuckle, referred to as a live spindle. As illustrated (and which will be further explained), the spindle 40 of the present embodiment is a portion of an integral structure including a mounting hub 36 for wheel 30 and a housing 60 that houses the clutch mechanism.

The spindle 40 of the integral structure is rotatively supported by a bearing pack 38 fixedly mounted to the knuckle 32 by fasteners 50. The bearing pack 38 is considered to be an integral portion of the knuckle 32 when affixed by fasteners 50. The spindle 40 is rotatively supported in the bearing pack 38 on bearings 42 and 44. The spindle 40 (and thus the entire integral structure) is secured in the bearing pack by a nut 46 threadably installed on the end of the spindle 40. The nut 46 engages the inner race of the bearing pack to clamp the inner race against the shoulder 48 of the spindle as shown.

As seen in FIG. 2, an end portion 52 of the axle 28 extends into the spindle 40. An externally splined end 54 of the end portion 52 of the axle 28 extends beyond the spindle and hub 36 and extends into the housing 60 of the integral structure. The housing 60 is configured to house the clutch mechanism and will hereafter be referred to as a hub clutch housing or simply a clutch housing 60. The end portion 52 of axle 28 is rotatively supported on bearings 56, 58 fitted to the internal wall defined by a cylindrical cavity of the spindle 40 and hub 36. The integral structure of spindle 40, hub 36 and clutch housing 60 is thus rotatably mounted to the knuckle 32, and end portion 52 of the axle 28 is independently mounted to the inside wall of the spindle 40 so as to have a common axis of rotation 34. The axle 28 and the integral structure of the spindle 40, hub 36 and housing 60 are either coupled to have unity of rotation or uncoupled to have independent rotation. This is accomplished by a hub lock clutch mechanism that is operable by fluid pressure such as provided by air pressure which will be later explained. The provision of air pressure to and from the clutch mechanism will first be explained.

Figure 3A:
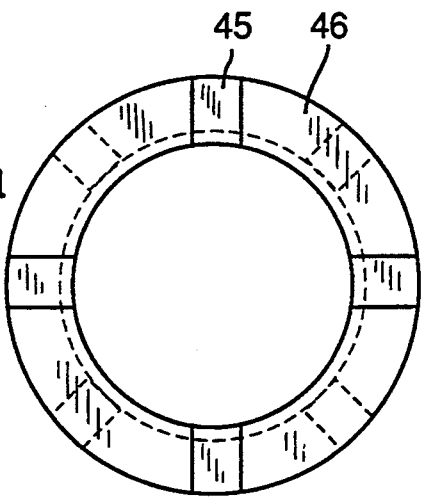
FIGS. 3a and 3b are front and side views of a retaining nut utilized for the air circuit of FIG. 3.
Figure 3B:
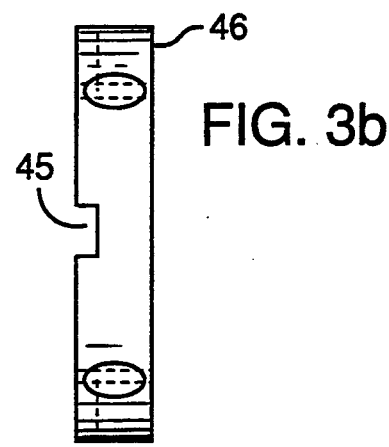
Figure 3:
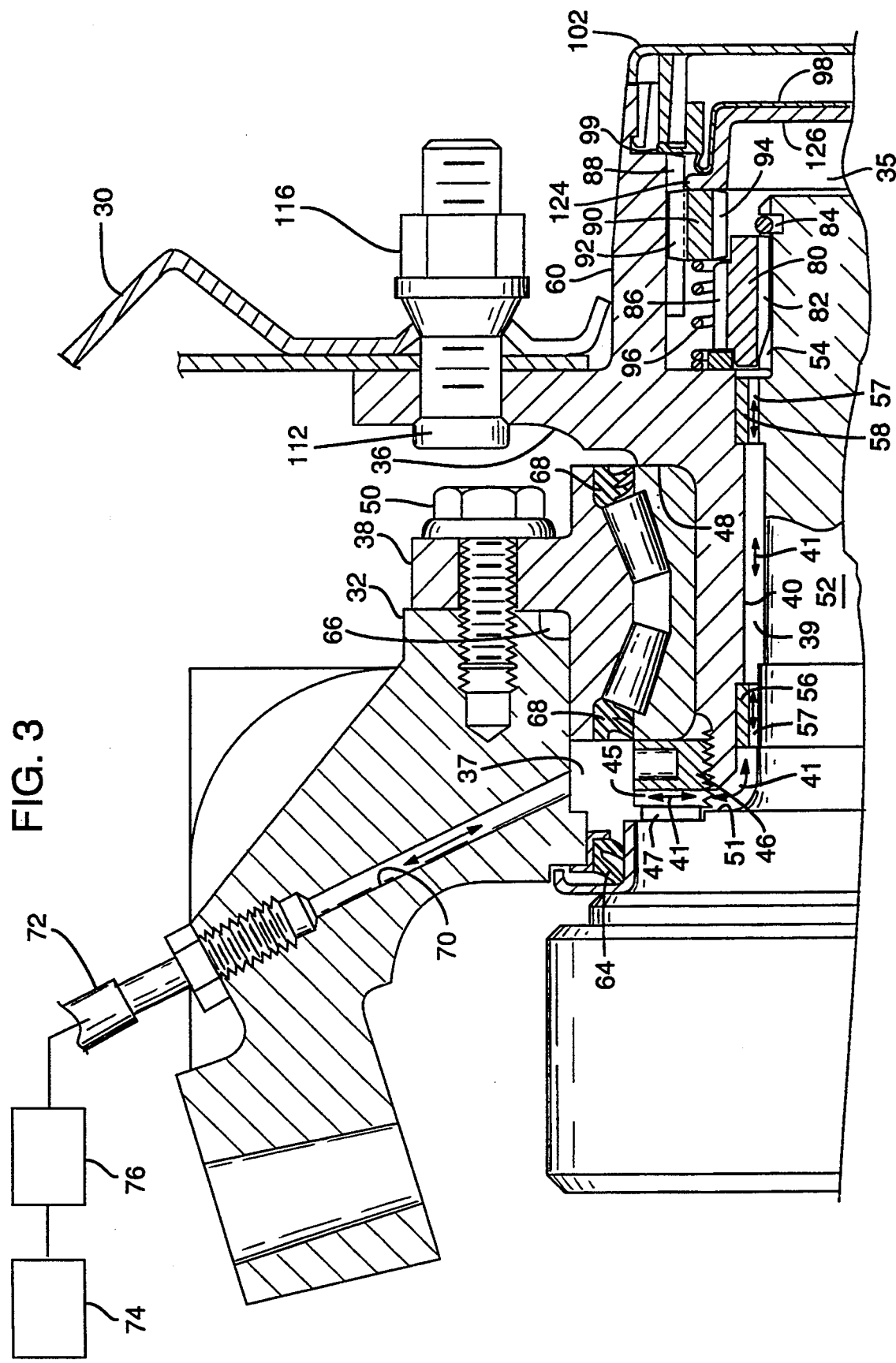
FIG. 3 is an enlarged partial view of the hub clutch mechanism of FIG. 2 illustrating the air circuit.

Refer now principally to FIG. 3 but also to FIGS. 1 and 2. Air must be supplied or removed from a cavity 35 provided in the wheel end for selective operation of the air operated clutch mechanism. It is therefore necessary to provide a route or circuit for controlled air pressure, e.g., from the vehicle's motor. As seen in FIG. 3, the end portion 52 of the axle 28 (within the spindle 40) is sealed with respect to the knuckle 32 by a seal 64. The bearing pack 38 is preferably sealed with respect to the knuckle 32 by a seal 66, and the bearings 42, 44 of the bearing pack are sealed by seals 68. An interior air tight cavity 37 is therefore established by the knuckle, bearing pack and the seals 64, 66 and 68, the cavity having an inlet port 70 and an outlet port indicated by arrows 41.

As seen in FIG. 3, the port 70 is suitably bored for a connecting air line 72 in a conventional manner. The air line 72 is connected to an air source 74, such as negative air pressure provided by the intake manifold of the vehicle engine, via a valve system 76. The flow of air either into or out of the air line 72 and thus the cavity 37 is controlled by the valve system 76 in a known conventional manner. An explanation of such a valve system is provided in the commonly assigned U.S. Pat. No. 4,627,512.

Figure 4A:
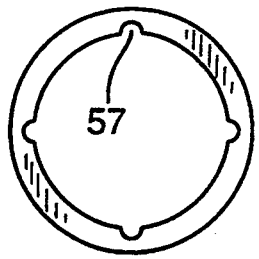
FIGS. 4a and 4b are a front view and a side sectional view of an axle bushing utilized for the air circuit of FIG. 3.
Figure 4B:
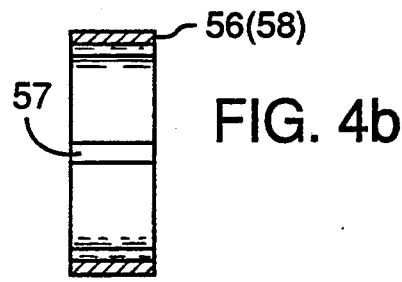

As previously mentioned the nut 46 fitted on the end of the spindle 40 is in abutment with the inner race of the bearing pack 38 and as shown in the enlarged view of FIG. 3, the opposite side of the nut 46 is also in abutment with a thrust bearing 47 provided on a shoulder 51 on end portion 52 of the axle 28. Air flow to cavity 35 is provided through the spacing 39 at the interface of axle portion 52 and spindle 40. To provide the passage 41 for air to flow between cavity 37 and the spacing 39, the nut 46 (see FIGS. 3a, 3b) is provided with multiple radial slots 45 at spaced intervals. This permits air to flow into and out of the confines of the cavity 37 through the nut 46 and behind the end of the spindle 40 as indicated by arrows 41. In the alternative, radial passages can be provided in the bearing 47 to provide a flow path for the air. To provide a passage for air to flow along the length of the spindle portion 40, that is along the space 39 between the axle 28 and the interior of the spindle portion 40, to (and from) the cavity 35, the bearings 56 and 58 are provided with longitudinal grooves 57 as shown in FIGS. 4a and 4b. A passage for air flow is thus provided from the air source 74 to the cavity 35 whereat the clutch mechanism is housed which will now be explained.

Figure 6:
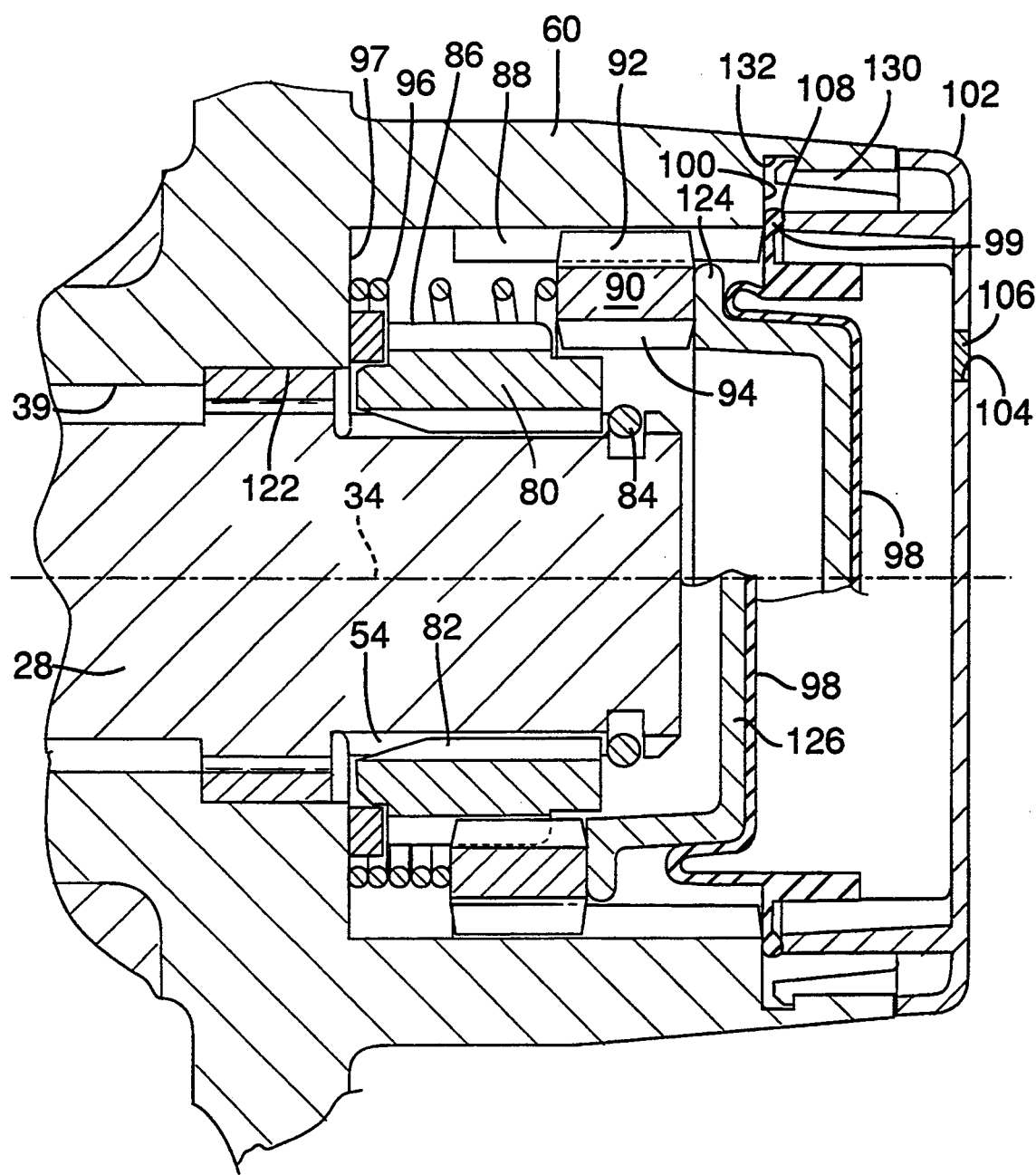
FIG. 6 is an enlarged partial view of FIG. 2 showing one embodiment of a clutch mechanism utilized in the clutch housing of FIG. 5.

Refer to FIGS. 2 and 6 of the drawings. The clutch mechanism is mounted in the clutch housing 60 which selectively couples or uncouples the axle 28 and the wheel 30 via the clutch housing 60 (the clutch housing being integrated with hub 36). The clutch mechanism has a clutch ring 90 with a fitted diaphragm 98 mounted in the clutch housing 60. The clutch ring 90 and diaphragm 98 are movable axially in the clutch housing 60 (along axis 34) but are fixed rotatively and thus rotate with rotation of the clutch housing 60 (and the hub and spindle integral therewith). The diaphragm 98 having its periphery fitted between a shoulder 100 of the clutch housing 60 and a protective cap 102 fitted to the end of clutch housing 60, seals the hub end. The cavity 35, is thus sealed to prevent entry or exit of air except through the passage defined by space 39 between the spindle and axle. Since the diaphragm 98 is moveable while still maintaining the seal of the clutch housing 60, the cavity 35 defined is thus an expandable chamber. A port 104 (in the cap 102) fitted with a filter 106 is provided for free air flow into and out of the space between the diaphragm 98 and the cap 102. This insures that the opposing pressure is always ambient air pressure, i.e., neither pressure or vacuum pressure is allowed to build behind diaphragm 98 to oppose the actuating pressure from air line 72.

As shown, the axle 28 is fitted with a drive ring 80 in a conventional manner and primarily for assembly purposes. Movement of the clutch ring 90 in one direction along splines 88 of the clutch housing 60 (inwardly from the position shown in the top half of the portion shown in the bottom half) forces engagement of the splines 94 of the clutch ring with splines 86 of the axle's drive ring 80 to couple the axle 28 to the clutch housing 60. Movement of the clutch ring in the opposite direction (outwardly) will uncouple the axle from the hub (i.e., the splines 94 of the clutch ring 90 will be out of engagement with the splines 86 of the drive ring 80). Movement of the clutch ring 90 into engagement with the drive ring 80 is affected by withdrawing air from the defined cavity 35 as by vacuum. The differential air pressure (caused by the withdrawal of air from the defined cavity) exerts a force on the diaphragm 98 to move the clutch ring 90 into engagement with the drive ring 80. The clutch ring 90 is urged out of engagement with the drive ring 80 by a spring 96 fitted between the clutch ring 90 and a shoulder 97 of the clutch housing 60 when air is introduced into the defined cavity 35 to equalize the air pressure on each side of the diaphragm. Air is permitted into and out of the space behind the diaphragm through the filter 106.

Figure 5:
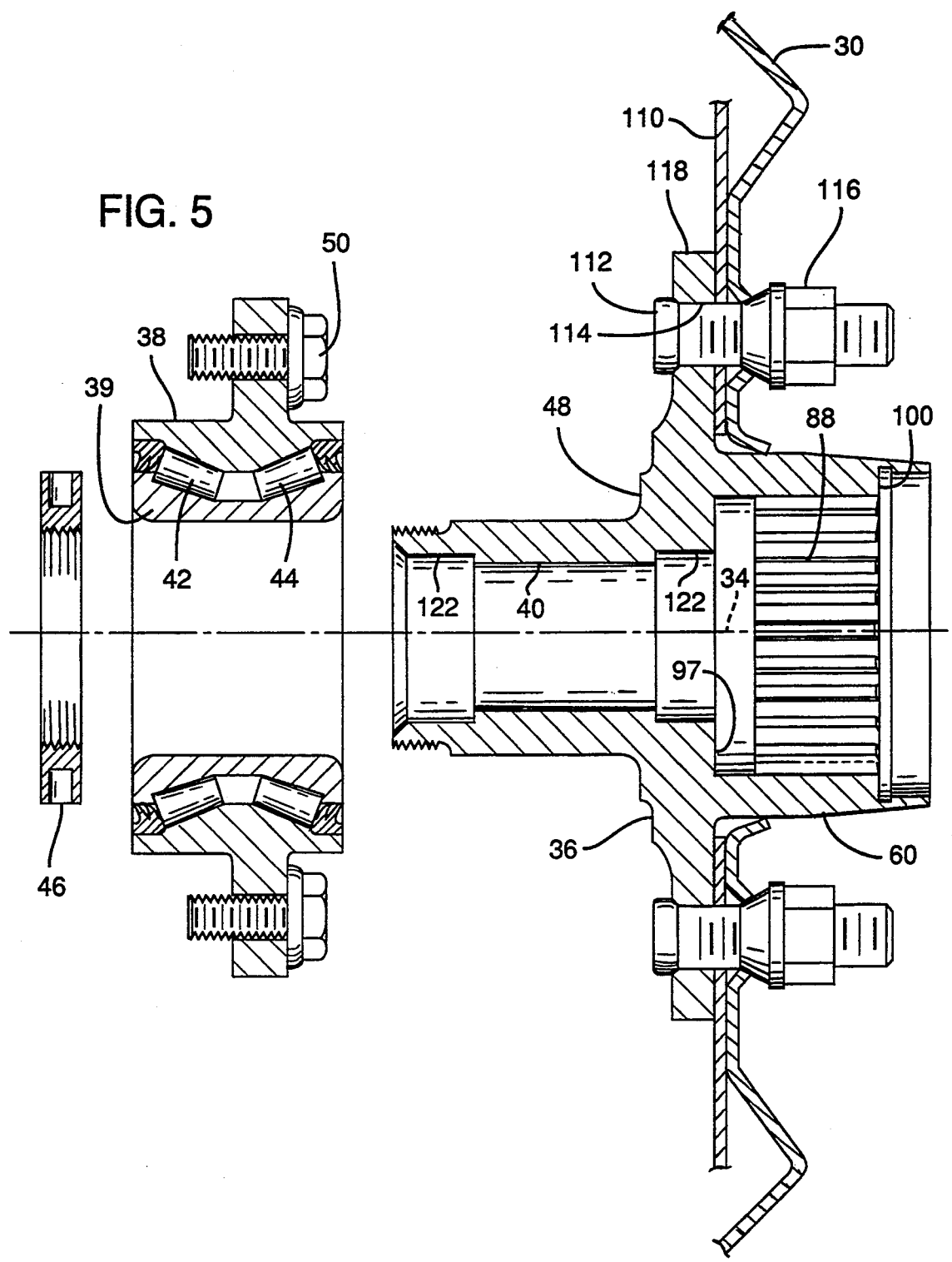
FIG. 5 is an exploded view illustrating an integral live spindle, hub and clutch housing in accordance with the inventions hereof.

Refer now to FIG. 5 of the drawings. It illustrates in exploded view the integral structure comprising the spindle 40, hub 36 and clutch housing 60. As previously stated, this structure is rotatably mounted to the bearing pack 38 having bearings 42, 44 and is retained by nut 46 threadably installed on the end of spindle 40 and in abutment with the inner race 39 of the bearing pack which forces a shoulder 48 of the hub 36 near the opposite end of spindle portion 40 against the opposite end of the inner race 39. A brake rotor 110 and wheel 30 are fitted to a flange 118 of the hub 36 with multiple fasteners 112 and secured by nuts 116. The fasteners 112 are preferably of the serrated type that are press fit into bores 114 provided at spaced intervals in the flange 118 at a radial distance from the rotational axis 34 (i.e., centerline) of the hub 36.

The interior of the clutch housing 60 is provided with splines 88 that are extended along a portion of the hub end as shown. Annular bearing receiving grooves 122 formed at each end of the interior of the spindle portion 40 are provided for receiving the bearings 56, 58 (bearings not shown in FIG. 5 but see FIG. 2) for rotatively supporting the end portion 52 (and the affixed drive ring 80) of the axle 28.

The live spindle arrangement provides the capability of utilizing large bearings for larger load carrying capacity. The pre-assembly of the bearing pack 38 to the integral structure and the installation of the brake rotor 110 on the flange of the hub 36 minimizes time for assembly to the vehicle and eliminates the adjustment time required for preloading the spindle bearings. All that is required to secure the assembled wheel end to the vehicle is to fasten the bearing pack 38 to the knuckle 32 as by fasteners 50.

Referring to FIG. 6, the clutch housing 60 is configured to receive the clutch ring 90 without the need for an added bolt-on hub cover. The clutch housing 60 is adapted to receive the splined end 54 of the front drive axle 28 and a drive ring 80 is mounted to the splined end 54 of the axle. Abutting to the clutch ring 90 is a shaped support plate 124 supporting the diaphragm 98 and maintaining the desired configuration thereof.

The pliable diaphragm 98 conforms to the shaped plate 124 as shown in the figure. The peripheral edge 99 of the diaphragm 98 is compressively held between a shoulder 100 of the clutch housing 60 and an edge 108 of the cap 102. The cap 102 is retained on the clutch housing 60 by multiple formed latches 130 of the cap 102 fitting in a formed annular groove 132 of the clutch housing 60. The latches 130 are of a resilient material permitting a hook on the end of the latch to deflect toward the center during installation of the cap to the clutch housing 60. The resilience of the material of the latch 130 will bias the hook into the groove 132 to secure the cap 102 to the clutch housing 60.

Figure 7:
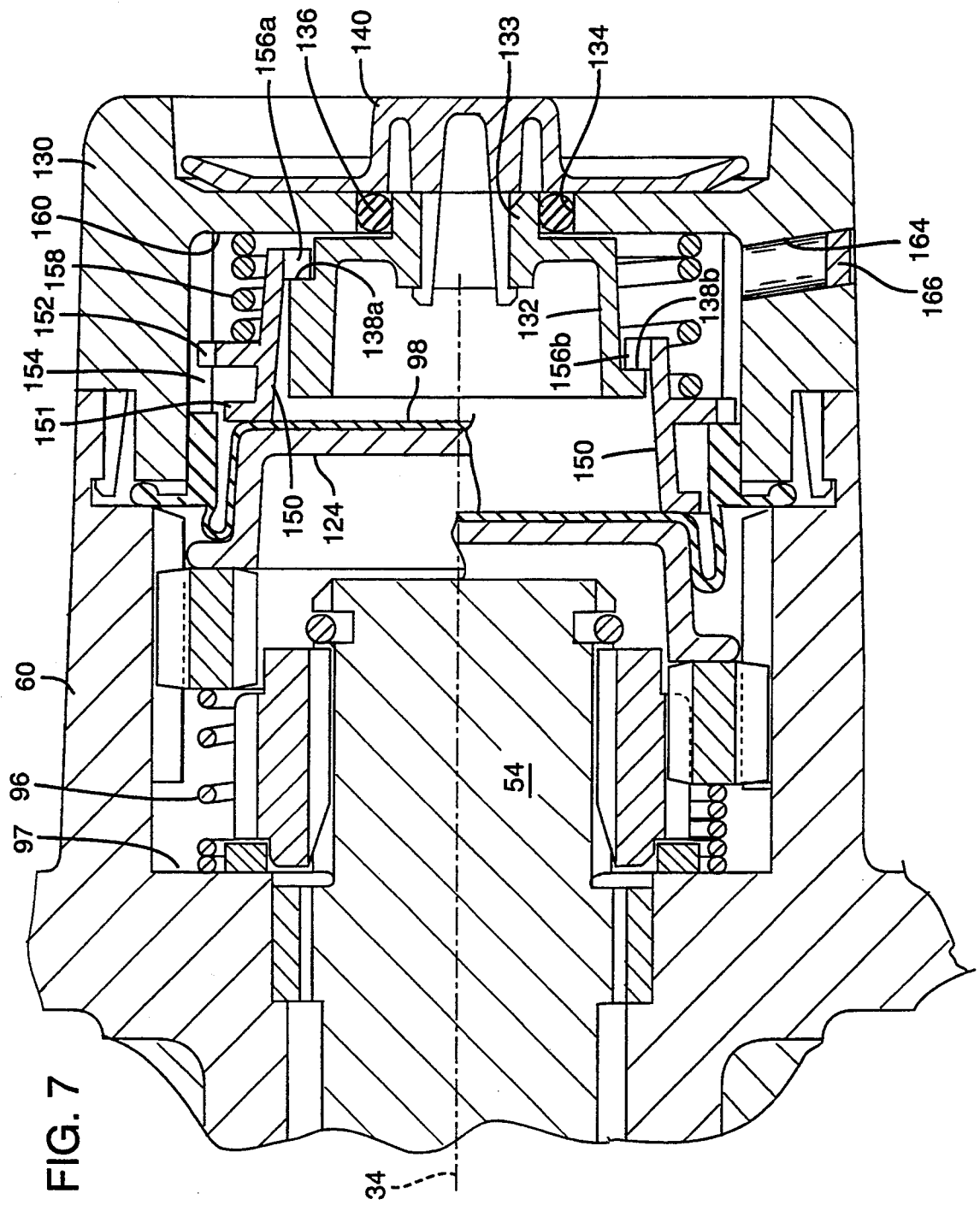
FIG. 7 is an enlarged partial view of a manual override mechanism for the clutch mechanism of FIG. 6.

Refer now to FIG. 7. It is desirable to have the capability of engaging the clutch mechanism in the event of an air system failure. Should the air system fail, such as caused by a broken air line 72 or other causes, the clutch mechanism would not be functional. To provide the facility to manually operate the clutch mechanism, a manual dial override is provided as illustrated in FIG. 7. As seen in the figure, the clutch housing 60 does not require any alteration for the addition of the manual override feature.

The manual dial override is contained in a cap 130 (which replaces the cap 102). The cap 130 is fitted to the clutch housing 60 in the same manner as the cap 102. The cap 130, as shown, is cup shaped and houses the manual override mechanism. The cap 130 has a cam member 132 having a handle portion 133 rotatably mounted in a bore 134 on a bearing 136 defining an opening through the cap as illustrated. The cam member 132 has a peripheral configuration that defines dual helical cam surfaces 138a and 138b disposed 180 degrees from each other. An external dial 140 is supported and fixedly attached to the handle portion 133 secured to the handle portion 133 of cam member 132 and is provided to rotate the cam member 132 relative to the cap 130.

A shaped cam follower 150 is mounted in the cap 130 and is moveable axially along axis 34. The follower 150 has legs 152 engaging inwardly extending teeth 154 of the cap 130 with the follower 150 slidably moveable along the length of the teeth 154 (along axis 34). The legs 152 in engagement with the teeth 154 prevent rotation of the follower 150 with respect to the cap 130.

A pair of cam lobes 156 of the follower 150 are urged against the cam surface 138 by a compression spring 158 disposed between the leg 152 of the follower 150 and the inside surface 160 of the cap 130. The spring 158 exerts a greater force than the spring 96. A port 164 fitted with a filter 166 provides for unrestricted entry or exit of air into the cap 130 behind the diaphragm 98 for normal vacuum operation in the same manner described for port 104 provided in the cap of FIG. 6.

The override mechanism is typically in the position shown in the top half of FIG. 7, i.e., with the spring 158 compressed and thereby allowing the spring 96 to force disengagement in the normal vacuum operation. In the event it is required to operate the clutch mechanism manually with the manual override, the dial 140 is rotated which rotates the cam member 132. As the cam member 132 is rotated, the cam lobes 156 of the cam follower 150 will be urged by the spring 158 to follow the helical cam surfaces 138 to the position indicated at the bottom half of FIG. 7. The cam follower 150 will thus move axially along axis 34 inwardly, i.e. toward the splined end 54 of the axle residing in the spindle 40. The leg 151 of the follower in contact with the diaphragm 98 fitted to the plate 124 will force the clutch ring 90 to move into engagement with the drive ring 80 since the compressive force of the spring 158 is greater than the compressive force of the spring 96. To disengage the clutch mechanism, the dial is rotated in the opposite direction and the cam surface 138 in contact with the lobe 156 will force the follower 150 to move outwardly, i.e., toward the surface 160 of the cap 130, and in the process will compress the spring 158. The spring 96 will urge the clutch ring 90 out of engagement with the drive ring 80.

Figure 8:
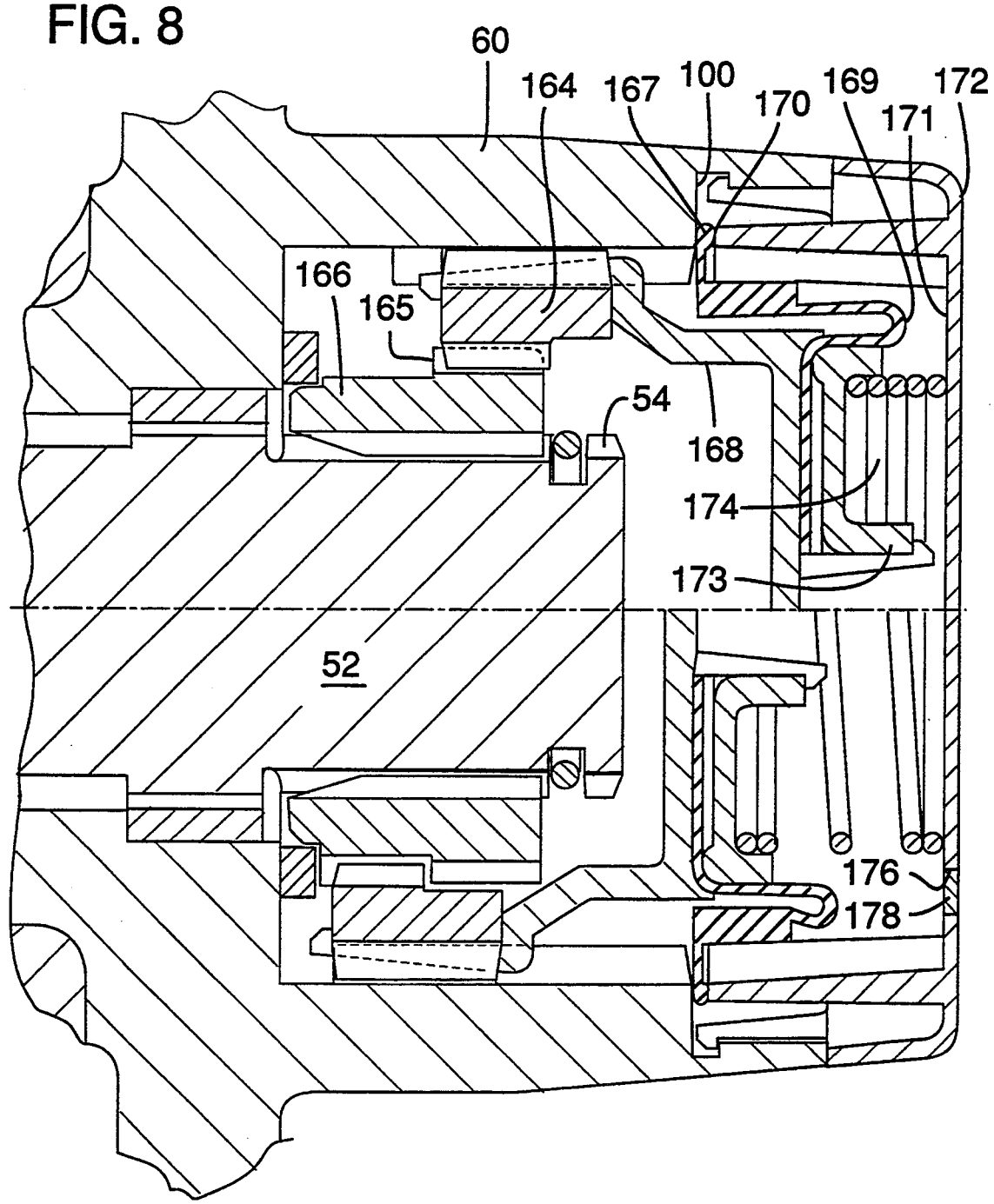
FIG. 8 is an enlarged partial view similar to FIG. 6 illustrating another embodiment of a clutch mechanism.

The integral structure including the live spindle, wheel hub and clutch housing is also suited for the application of a pressure operated clutch mechanism as illustrated in the enlarged partial view of FIG. 8. The structure need not be materially altered for the application of the pressure actuated clutch mechanism and therefore has a similar configuration to that of the vacuum operated clutch mechanism of FIG. 6. As shown in FIG. 8, the pressure operated clutch mechanism includes a clutch ring 164 slidably mounted in the clutch housing 60, a drive ring 166 mounted on the splined end 54 of the axle portion 52, a shaped plate 168 fixedly attached to the clutch ring 164, a diaphragm 169 fitted to and preferably bonded to the plate 168 as by an adhesive and having its peripheral edge 167 held captive between shoulder 100 of the clutch housing 60 and an edge 170 of a cap 172. The difference is in the relative positions of splines 165 on the drive ring 166, i.e., they are located to engage with the clutch ring in the outer position as shown in the top half of the drawing and disengaged in the inner position, i.e., with the pressure removed. Also, the compression spring 174 is disposed between a spring carrier 173 (which engages the diaphragm 169 opposite plate 168) and the inside surface 171 of the cap 172. As in the vacuum operated embodiment, the cap 172 has a port 176 fitted with a filter 178 for entry and exit of air.

The clutch housing 60 fitted with the clutch mechanism operated by positive pressure has the same air circuitry as described in reference to FIGS. 2 and 3 excepting that the valve system 76 would be communicating with a conventional air source that outputs a positive pressure such as a compressor. The clutch housing 60 also has the same defined sealed cavity since the hub itself is not altered except as indicated.

In operation, the spring 174 opposes the positive pressure applied to the plate 168 and the diaphragm 169 and will urge the clutch ring 164 to disengage from the drive ring 166 when the pressure is released from the defined cavity 35 within the clutch housing 60 of the integral structure.

Figure 9:
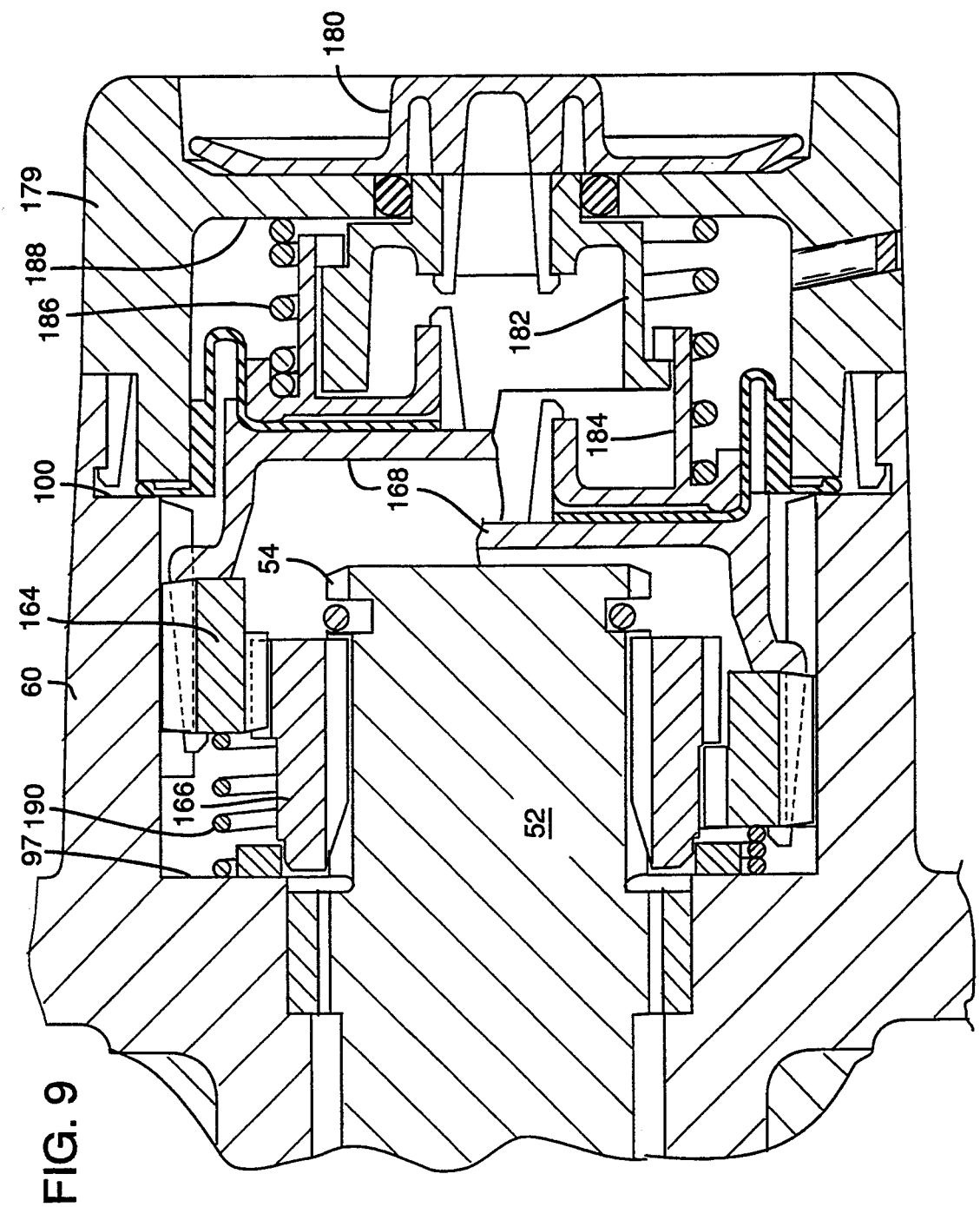
FIG. 9 is a view of a manual override mechanism for the clutch mechanism of FIG. 8.

Refer now to FIG. 9 of the drawings. The clutch mechanism operated by positive pressure is also suited to have a manual override mechanism substantially the same as for vacuum operation. The override mechanism is included in a cap 179 fitted to the clutch housing 60. The override mechanism is illustrated in FIG. 9 and as shown is substantially the same as the vacuum operated hub clutch of FIG. 7. The manual override mechanism includes a dial 180 connected to a cam member 182, a cam follower 184, a spring 186 disposed between the cam follower and the inside surface 188 of the cap 180 and a second spring 190 fitted between the clutch ring 164 and the shoulder 97 of the clutch housing 60. The spring 190 is provided to urge the clutch ring 164 into engagement with the drive ring 166 when the dial 180 is rotated, causing the cam member 182 to retract the spring 186. The spring 186 that urges the clutch ring out of engagement exerts a force greater than spring 190. Although substantially the same structure, the manual dial functions opposite that of FIG. 7. Thus, in normal pressure operations, spring 186 resists engagement. Spring 190 and the pressure applied overcome the spring 186 (for engagement) and with the pressure relieved, spring 186 overcomes spring 190 to disengage. Manual actuation occurs when the spring 186 is compressed by the dial 180 to allow spring 190 to force engagement independent of pressure.

Figure 10:
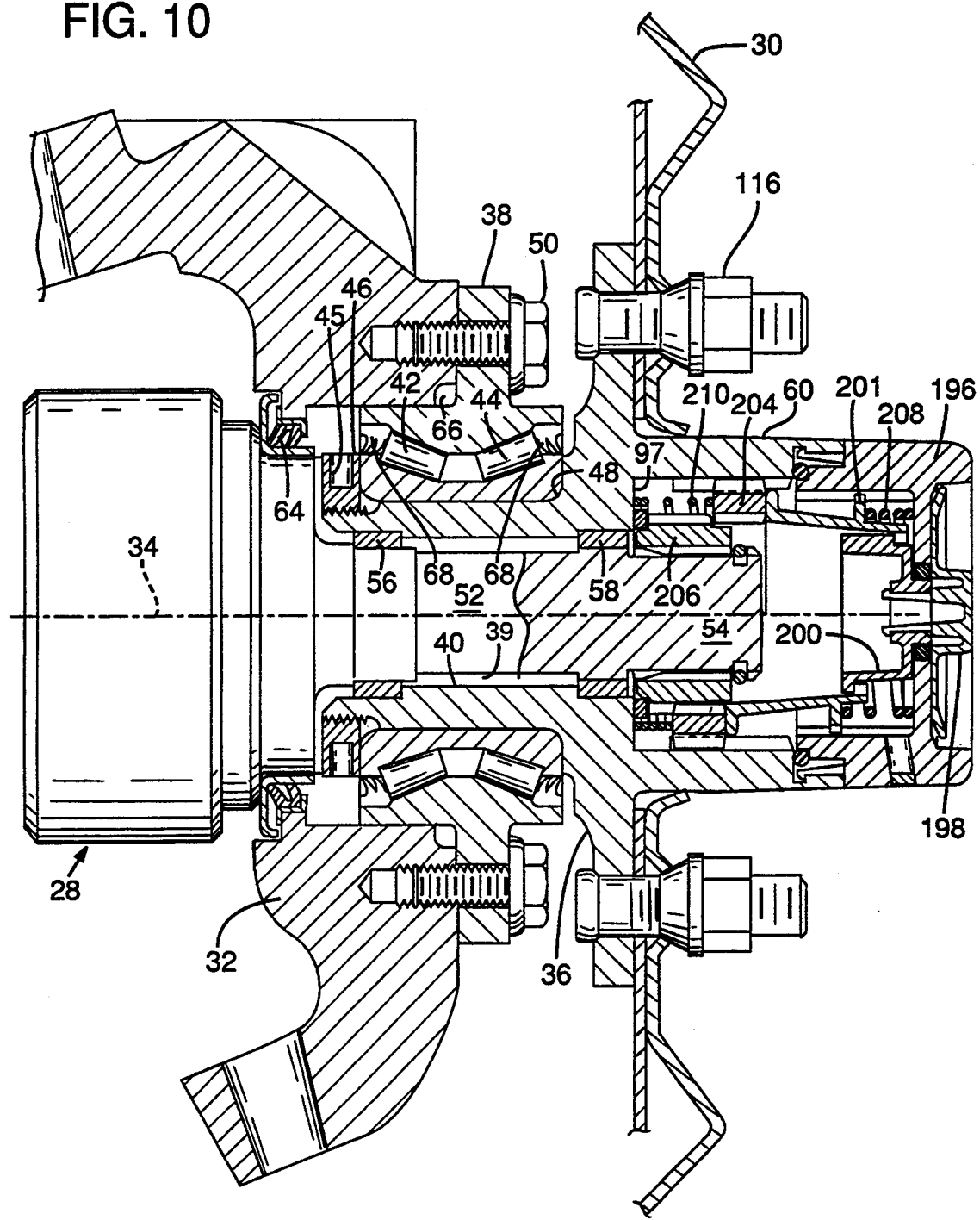
FIG. 10 is an enlarged partial view of the integrated wheel end illustrating another embodiment of a clutch mechanism.

The integral structure is also suited for a manual hub locking clutch mechanism illustrated in FIG. 10. The integral structure of the spindle 40, hub 36 and clutch housing 60, as illustrated in FIG. 10 does not require the port 72. The same or similar seals are provided however to prevent entry of contaminants into the integrated wheel end. The manual clutch mechanism has a clutch ring 204 mounted in the clutch housing 60 that is engageable with a drive ring 206 mounted to the splined end 54 of the axle 28. A spring 210 disposed between a shoulder 97 of the clutch housing 60 and the clutch ring 204 urges the clutch ring out of engagement with the drive ring 206. The manual clutch mechanism includes a cap 196 fitted to the clutch housing 60. A dial 198 is connected to a cam member 200 rotatably mounted in the cap 196. A cam follower 202 is mounted in the cap in a non rotative but sliding manner as with previous manual override systems. A spring 208 disposed between the inside surface of the cap 196 and a leg 201 of the cam follower 202 urges the clutch ring 204 into engagement with the drive ring 204 when the cam member is rotated by the dial 198 permitting the cam follower 202 to move axially. Rotation of the dial 198 rotates the cam member 200 allowing the spring 208 to urge the cam follower 202 in contact with the clutch ring to move the clutch ring 204 into engagement with the drive ring 206. The spring 208 exerts a greater force than the spring 210 and thus overcomes the force of the spring 210. The spring 210 will urge the clutch ring out of engagement when the dial 198 is rotated to rotate the cam member 200 which will cause the cam follower 202 to retract and compress the spring 208 permitting the spring 210 to urge the clutch ring 204 to move out of engagement with the drive ring 206.

Those skilled in the art will recognize that variations may be made without departing from the true spirit and scope of the inventions described herein. The embodiments detailed and described provide for engagement of the clutch mechanism due to the application of pressure (either negative or positive pressure). It is apparent that the application of pressure may be arranged to affect disengagement of the clutch mechanism. Consider the clutch mechanism engaged by negative pressure as illustrated in FIG. 6. The application of negative pressure caused the clutch ring to move axially inward thus engaging the clutch ring with the drive ring. By simply changing the external splines on the drive ring (such as illustrated in FIG. 8), the application of the negative pressure would cause the clutch ring to become disengaged from the drive ring. The spring would provide the force causing engagement when pressure is equalized on each side of the diaphragm. The operation of the clutch mechanism utilizing positive pressure may similarly be reversed by reversing the positions of the splines, i.e., pressure actuation will cause disengagement and the return spring will cause engagement with the pressure released. Those skilled in the art will readily recognize this capability.

The benefits realized in the inventions encompassed within the described embodiments are several and interrelated. The integral structure the encloses the live spindle wheel hub and clutch housing provide significant reduction in parts, easier assembly capability and interchangeability of the different operating techniques. The challenges of providing vacuum and pressure operation to the diaphragm-operated clutch ring is satisfied by the unique mounting arrangement for directing air flow around the live spindle and into the space defined between the live spindle and axle. The provision of a manual override for remote air actuation is believed unique in itself with further benefits in being able to provide override feature with a simple exchange of hub end closing caps. The invention/inventions broadly encompasses all of these benefits as will be determined by reference to the claims appended hereto.

I claim:

1. In a part-time four-wheel drive vehicle having a clutch mechanism associated with a wheel mounting and wheel axle for engaging and disengaging the wheel mounting and wheel axle to convert between two-wheel and four-wheel drive, a mechanism comprising;

a knuckle fixed to the frame of a vehicle and defining a bearing enclosure, a spindle rotatably mounted within the bearing enclosure of the knuckle and defining a further bearing enclosure, and an axle rotatably mounted within the further bearing enclosure of the spindle, a hub for mounting a vehicle wheel and a hub clutch housing protruded from said hub and the combined hub and hub clutch housing affixed rotatively to the spindle and independent rotatively of the axle, said axle extended into the housing, and a clutch mechanism including overlapping portions of an axle exterior and a housing interior and splines provided on said overlapping portions, a clutch member slidably mounted relative to the housing and axle overlapping portions and being slidably movable between a first position wherein the splines of both portions are interengaged for interlocking the axle and housing and a second position wherein the splines of one of the portions are disengaged from said clutch member for permitting relative free rotative movement therebetween, and actuator means for actuating slidable movement of said clutch member between said first and second positions, said spindle having a tubular section extended partially into the bearing enclosure and extended partially outside the bearing enclosure and defining an exterior end, said hub comprising a flange formed integral with the tubular section of the spindle at the exterior end and flared radially outwardly from the axis of the tubular section and including means for attaching a wheel to the flange, and said hub clutch housing having a cylindrical section integral with the spindle and hub and extending axially outwardly of said hub flange through the center of a wheel mounted on said flange, said spindle, hub, hub flange, and hub housing including the portion of the housing provided with splines accordingly integrally formed and requiring no fasteners for affixing the hub and hub clutch housing rotatively to the spindle, said cylindrical section of said hub clutch housing having an open end, and a removable cap normally closing said open end, said mechanism and hub clutch housing cooperatively structured whereby installation and maintenance of the clutch mechanism are provided through said open end.

2. A hub clutch mechanism as defined in claim 1 wherein the arrangement of elements is adaptable to different forms of actuating means and said open end in the hub clutch housing provides access to the housing interior for removal and replacement of the different forms of actuating means.

3. A hub clutch mechanism as defined in claim 2 wherein the cap is interchangeable between a cap providing a cover only for the hub clutch housing and a cap provided with a dial for manual engagement and disengagement of the clutch member.

4. A hub locking system for a part-time four-wheel drive vehicle comprising;

a wheel hub, a drive axle, and a clutch member movable relative to the wheel hub and drive axle between a first and second position for relative rotative interlocking and unlocking of the wheel hub to the drive axle, automatic actuator means selectively and remotely operable by a vehicle operator to induce movement of the clutch member from the one position to the other position, and a first spring acting against the clutch member and opposing the operation of the automatic actuator means to urge movement of the clutch member in the opposite direction, said first spring generating a lesser force than the automatic actuator means when actuated, whereby the operation of the actuator means overcomes the opposing force of the first spring;

a manual override that allows manual operation when the automatic actuator means is not actuated comprising, a second spring opposing the first spring and urging the clutch member to the position opposite that urged by the first spring, one of said first and second springs generating a stronger force than the other, and a dial mechanism manually operable from outside the wheel hub to retract the strong spring and remove its effect on the clutch member movement whereby the weaker spring controls clutch member induced movement when the actuator means is not actuated.

5. A locking system as defined in claim 4 wherein the automatic actuator means is vacuum operated whereby the application of negative pressure draws the clutch member inwardly away from the dial mechanism, said weaker spring acting on the clutch member to urge movement toward the dial mechanism, and said strong spring urging engagement whereby the dial retracts the strong spring to permit the weaker spring to induce movement of the clutch member upon removal of the negative pressure.

6. A hub locking system as defined in claim 4 wherein the automatic actuator means is pressure operated whereby the application of positive pressure pushes the clutch member outwardly toward the dial and said weaker spring acting on the clutch member urges movement toward the dial to assist in overcoming the strong spring, and said strong spring urging disengagement upon removal of the pressure force, and said dial actuated to withdraw the strong spring force to allow movement of the clutch ring due to the weak spring force only upon removal of the air pressure.

* * * * *